US005367406A

United States Patent [19]

Suzuki et al.

[11] Patent Number: 5,367,406

[45] Date of Patent: Nov. 22, 1994

[54] OPTICAL DEVICE WITH INHERENT FOCUSING ERROR CORRECTION

[75] Inventors: Minoru Suzuki, Saitama; Hiroyuki Hirano, Kanagawa, both of Japan

[73] Assignee: Asahi Kogaku Kogyo Kabushiki Kaisha, Tokyo, Japan

[21] Appl. No.: 913,344

[22] Filed: Jul. 15, 1992

Related U.S. Application Data

[63] Continuation-in-part of Ser. No. 777,576, Oct. 16, 1991, Pat. No. 5,291,241.

[30] Foreign Application Priority Data

| | | | |
|---|---|---|---|
| Oct. 16, 1990 | [JP] | Japan | 2-278547 |
| May 28, 1991 | [JP] | Japan | 3-226639 |
| Jul. 16, 1991 | [JP] | Japan | 3-268108 |

[51] Int. Cl.[5] ........ G03B 13/36; G03B 27/34

[52] U.S. Cl. ........ 359/698; 359/696; 359/697; 354/400; 355/55; 355/56; 355/57

[58] Field of Search ........ 359/696–698; 355/55–57; 354/400, 402, 195.12

[56] References Cited

U.S. PATENT DOCUMENTS

| | | | |
|---|---|---|---|
| 4,322,159 | 3/1982 | Takahashi | 355/57 |
| 4,412,737 | 11/1983 | Iwanade et al. | 355/55 |
| 4,420,248 | 12/1983 | Ogawa | 355/57 |
| 4,557,593 | 12/1985 | Iwanade | 355/57 |
| 4,627,720 | 12/1986 | Yonemori | 355/57 |
| 4,825,252 | 4/1989 | Suzuki et al. | 355/32 |
| 4,974,948 | 12/1990 | Arai et al. . | |
| 5,005,037 | 4/1991 | Akashi | 354/400 |
| 5,060,001 | 10/1991 | Kaneda | 354/400 |
| 5,117,256 | 5/1992 | Haibara | 355/55 X |

FOREIGN PATENT DOCUMENTS

| | | | |
|---|---|---|---|
| 63-311275 | 12/1988 | Japan . | |
| 0163712 | 6/1990 | Japan | 359/698 |

*Primary Examiner*—Eugene R. LaRoche
*Assistant Examiner*—Son Mai
*Attorney, Agent, or Firm*—Sandler Greenblum & Bernstein

[57] ABSTRACT

In an imaging apparatus, provided is an optical device which is capable of changing the magnifying power thereof. The optical device includes a zoom lens system having a power varying lens group and a correction lens group both of which are movable in the direction of the optical axis of the zoom lens system with respect to the zoom lens system. The zoom lens system is moved in the direction of the optical axis of the zoom lens system, and the power varying lens is driven synchronously with the movement of the zoom lens system. Further, the zoom lens system and the correction lens are moved in accordance with a magnifying power and data representing the amount of the displacement of the zoom lens system respective to the optical axis and the displacement of the correction lens with respect to the optical system.

19 Claims, 8 Drawing Sheets

OPTICAL DEVICE WITH INHERENT FOCUSING ERROR CORRECTION

This application is a continuation-in-part of U.S. patent application Ser. No. 07/777,576, filed Oct. 16, 1991, now U.S. Pat. No. 5,291,241 entitled "Optical Device", the disclosure of which is expressly incorporated by reference herein in its entirety.

BACKGROUND OF THE INVENTION

The present invention relates to an improvement of all optical device for forming a magnified image of an object onto a light receiving surface, and more specifically, to the optical device which is employed in an imaging apparatus such as a copy machine which is capable of varying its magnifying power.

Conventionally, in this kind of optical device, a zoom lens system is mounted on a carriage. The carriage is engaged with a driving unit which is mounted on a base plate provided on an apparatus main body for shifting the carriage in a direction along the optical axis of the zoom lens system. Further, a guide shaft is arranged in parallel with the optical axis of the zoom lens system in order for guiding the carriage. Pulleys and a wire are interposed between the carriage and the carriage driving unit so that the carriage is smoothly shifted in the direction along the optical axis of the zoom lens system in accordance with the actuation of the driving unit.

The zoom lens system includes a variable power lens group and a correction lens group. The variable lens group can be shifted in the direction along the optical axis thereof by means of a cam mechanism so as to change its magnification synchronously with the movement of the carriage.

It should be noted that in this kind of conventional optical device, a manufacturing error of an individual lens or an overall installation error of an apparatus could not be easily corrected, since all of the shift movements of the variable power lens group and the correction lens group were mechanically performed by a cam mechanism.

For example, a manufacturing error of lenses may cause small optical property differences such as an error of a focal distance or a color aberration. In such a case, in order to eliminate an effect of this kind of manufacturing error, it was required to change a cam configuration in each apparatus. Such a measure costs too much to introduce into a practice for mass-production.

SUMMARY OF THE INVENTION

It is therefore an object of the present invention to provide an improved optical apparatus for forming an image of an object with desired magnifying power, a manufacturing error of an individual lens or an overall installation error of an apparatus, which can be easily corrected.

For the above objects, according to the present invention, an optical device is employed in an imaging apparatus, wherein the optical device comprises:

a zoom lens system capable of varying the magnification power thereof, the zoom lens system including at least one correction lens group for being moved relatively to said zoom lens system to correct the focusing error which is inherent in the zoom lens system.

A first driving means drives said zoom lens system; and a second driving means drives the correction lens independently of the first driving means.

A storing means stores data used for correcting at least one of the focusing error and an error of the magnifying power with respect to the position of the zoom lens system.

A control means controls the first and second driving means in such a fashion that the first driving means drives the zoom lens system in accordance with the magnifying power and the data for correcting the error of the magnifying power, and that the second driving means drives the correction lens in accordance with the data for correcting the focusing error inherent to said zoom lens system.

The above and other objects, features and advantages of the present invention will become more apparent from the following detailed description which is to be read in conjunction with the accompanying drawings.

DESCRIPTION OF THE ACCOMPANYING DRAWINGS

DESCRIPTION OF THE EMBODIMENTS

FIGS. 2 to 7 show an embodiment of the present invention to be employed in a color copy machine as an optical apparatus capable of varying a magnifying power thereof.

Figure 2:
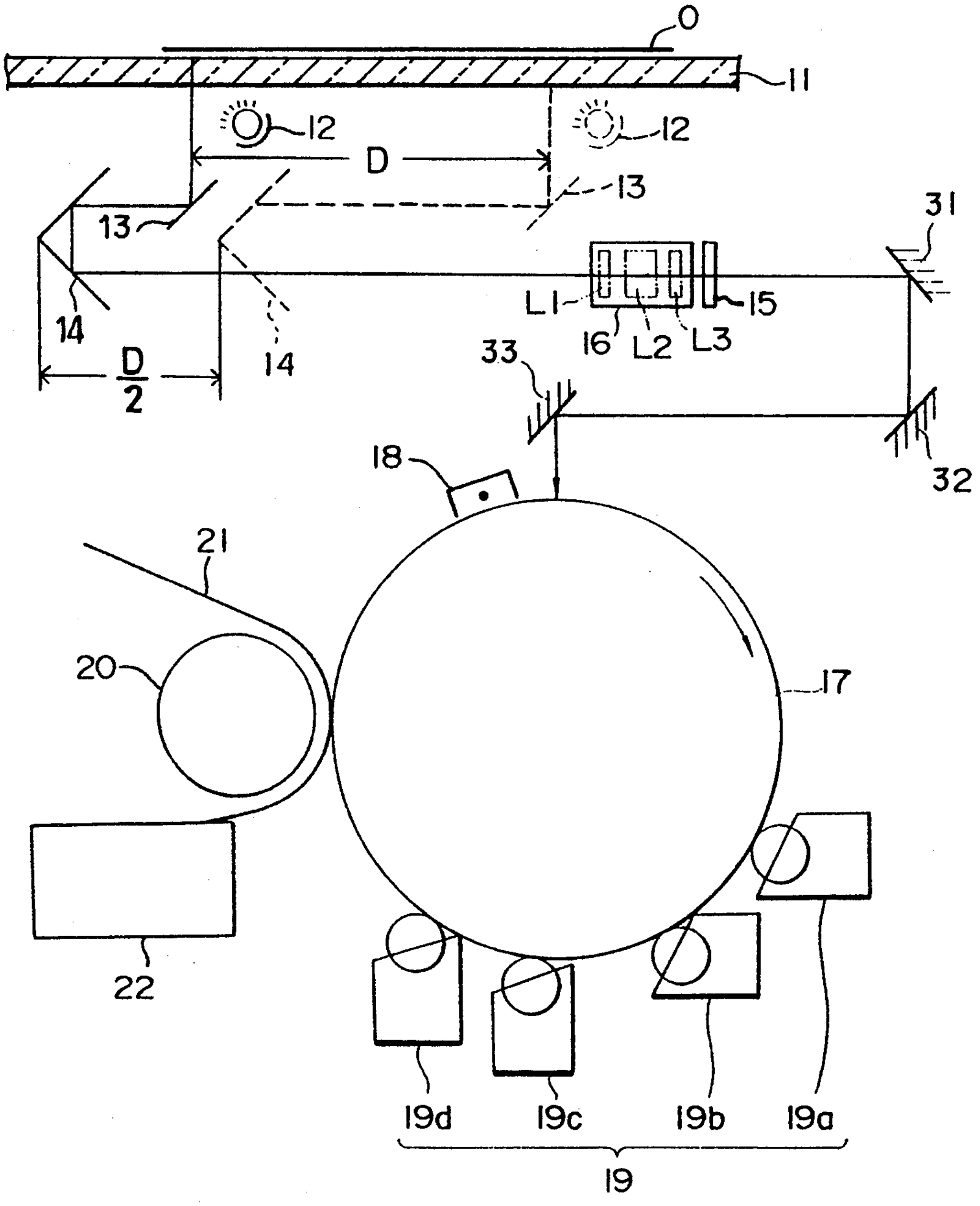
FIG. 2 is a view illustrating an overall constitution of the optical device.

In FIG. 2, an object O to be copied is placed on a transparent glass 11. Under the transparent glass 11 disposed are an illumination light source 12 and a pair of scanning mirrors 13, 14. The illumination light source 12 and scanning mirrors 13, 14 are constituted to be shiftable from a position indicated by a solid line, in the drawing, to a position indicated by a broken line, also in the drawing, by means of a shifting mechanism (not-shown), in order to carry out a scanning operation by emitting a slit-shaped illumination light toward the object O.

The light reflected on the surface of the object O is reflected by the scanning mirrors 13 and 14, and then, directed onto the uniformly charged circumferential surface of a photoconductive drum 17 through a zoom lens system 16, a color separation means 15, and fixedly arranged mirrors 31, 32 and 33.

It should be noted that the distance between the mirrors 13 and 14 varies such that the displacement of the mirror 14 is half of the displacement of mirror 13 so that the optical distance between the surface of the object O and the circumferential surface of the photoconductive drum 17 is unchanged during the scanning operation.

The color separation means 15 includes four filters: an M (monochrome) filter; a B (blue) filter; a G (green) filter; and a R (red) filter. By selectively inserting these filters into an optical path or retracting therefrom, a color-separated image is formed on the photoconductive drum 17. The M (monochrome) :filter is a filter capable of cutting an infrared ray.

The zoom lens system 16 includes three lens groups L1, L2, and L3. By changing mutual distances between these lens groups L1, L2 and L3, and also shifting entire zoom lens system in a direction of an optical axis, a magnification of the image projected onto the circumferential surface of the photoconductive drum 17 is changed without changing a distance between the object O and the image.

The lens group L2 is a variable power lens group which executes a varying operation of a magnifying power, and the lens group L3 is a correction lens group which adjusts the focal point as the magnifying power of the zoom lens system 16 changes.

Around the photoconductive drum 17 disposed are a charging means 18, a yellow-color developing means 19*a*, a magenta-color developing means 19*b*, a cyanogen-color developing means 19*c*, a black-color developing means 19*d*, and a transferring means 20. Latent images of respective colors formed on the photoconductive drum 17 are, after having been developed, copied or superimposed on a recording sheet 21 by means of the transferring means 20. The recording sheet 21 is fed synchronously with the circumferential speed of the photoconductive drum 17 by driving unit 22.

Next, a mechanical construction of a driving unit of the color copy machine is explained.

Figure 3:
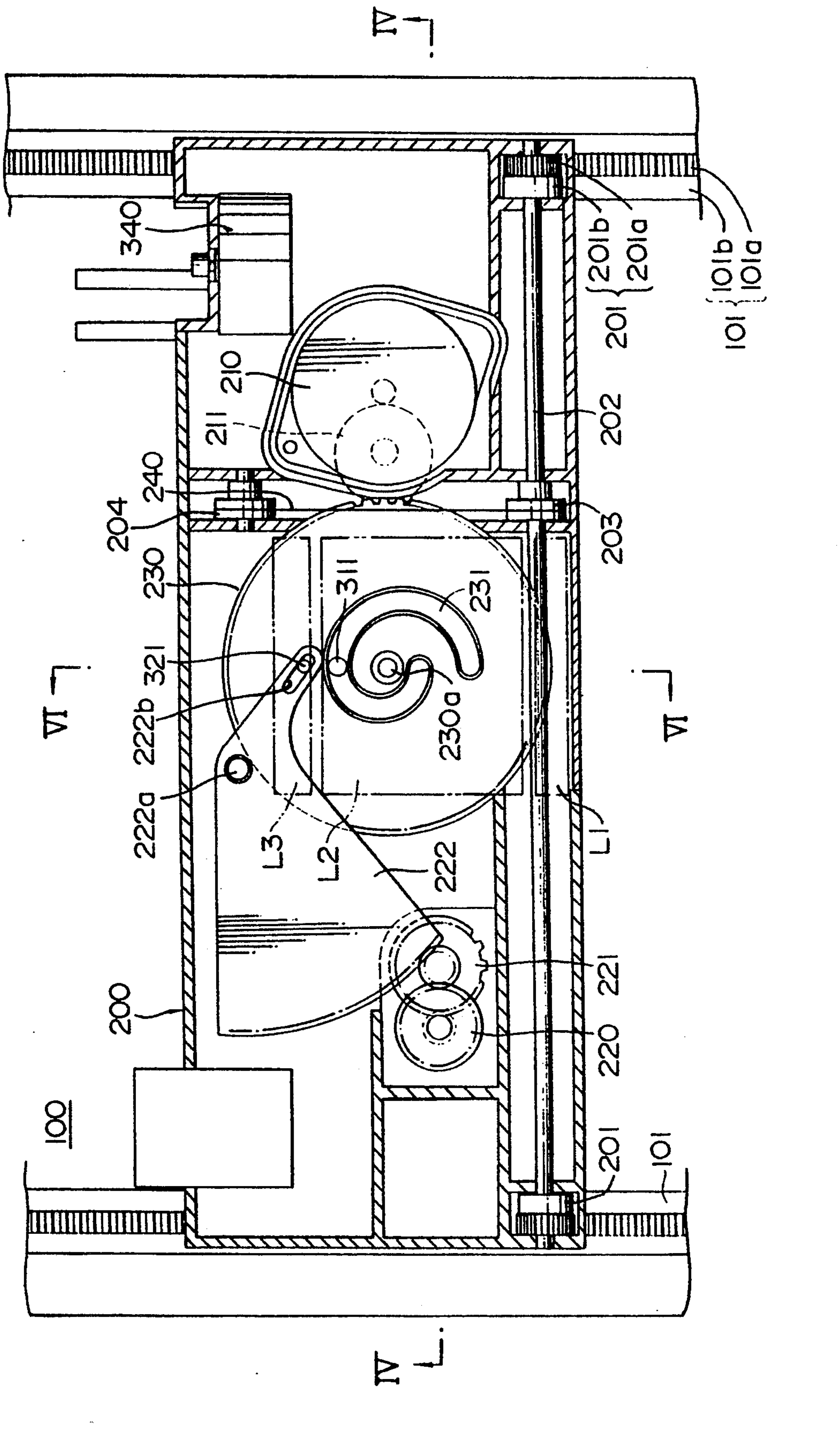
FIG. 3 is a plan view of a lens driving mechanism of the optical device embodying the present invention.

As shown in FIG. 3, on the main body 100 of the optical device, there is provided a pair of guide rails 101, 101 extending in the direction of the optical axis of the zoom lens system 16. A carriage 200 is mounted on the pair of guide rails 101, 101.

Each guide rail 101 includes a rack 101*a* formed on the outer portion of the guide rails 101, and a rail 101*b* formed on an inner portion of the rail 101. Corresponding to the guide rails 101 and 101, the carriage 200 has a pair of rollers 201, 201 each of which has a pinion 201*a* to mesh with the rack 101*a* and a wheel 201*b* sliding on the rail 101*b*. The roller 201 is fixed on a shaft 202, which is rotatably supported on the carriage 200, at both ends of the carriage 200.

On the carriage 200, there are provided a main motor 210 and a secondary motor 220. The main motor 210 serves as a first driving means for shifting the carriage 200 with respect to the main body 100 in the direction of the optical axis of the zoom lens system 16. Further, the main motor 210 shifts the variable power lens group L2 with respect to the carriage 200 in the direction of the optical axis of the zoom lens system 16. The secondary motor 220 serves as a second driving means for shifting the correction lens group L3 with respect to the carriage 200 in the direction of the optical axis of the zoom lens system 16 independently of the first driving means.

Figure 4:
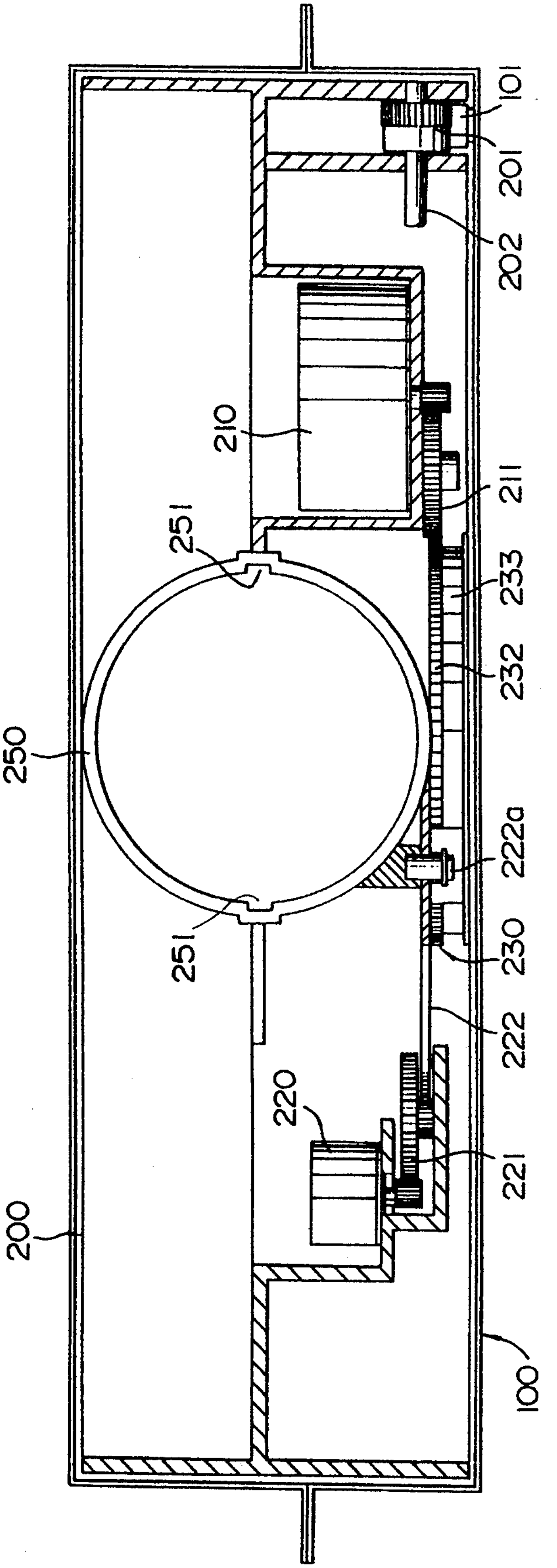
FIG. 4 is cross-sectional view taken along a line IV—IV of FIG. 3.
Figure 6:
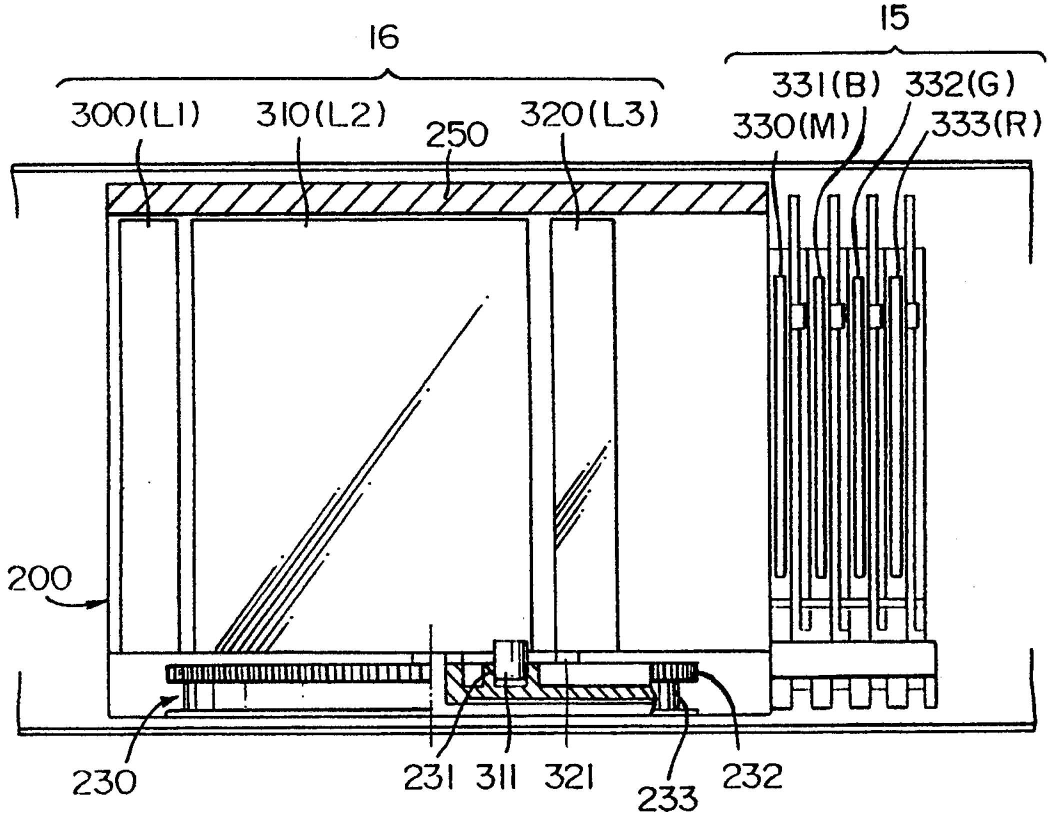
FIG. 6 is a cross-sectional view taken along line VI—VI of FIG. 3.

The main motor 210 turns a disk-shaped cam 230, which is provided substantially at the center of the carriage 200 through an intermediate gear 211, as shown in FIGS. 3 and 4. The cam 230 is rotatably supported on the carriage 200 through a shaft 230*a*. A spiral cam groove 231 is formed in the cam 230 as shown in FIG. 3, and the circumferential surface of the cam 230 is formed with a gear portion 232 meshing with the intermediate gear, and a bobbin portion 233 having a smaller diameter than the gear portion 232 as shown in FIG. 6. This bobbin portion 233 is provided for taking up a wire 240 which will be described later.

The secondary motor 220 controls a rocking movement of a sector gear 222 through a speed reduction gear 221. The sector gear 222 is connected to the carriage 200 through a shaft 222*a*, and has an elongated hole 222*b* at its distal end.

Furthermore, there is provided another motor 340 for selectively changing the filters. A changing-over mechanism of the filters is already well-known as is disclosed in the U.S. Pat. No. 4,825,252, and its detail explanation is omitted here.

Next, a mechanism for shifting the carriage 200 with respect to the main body 100 is discussed below.

Figure 5:
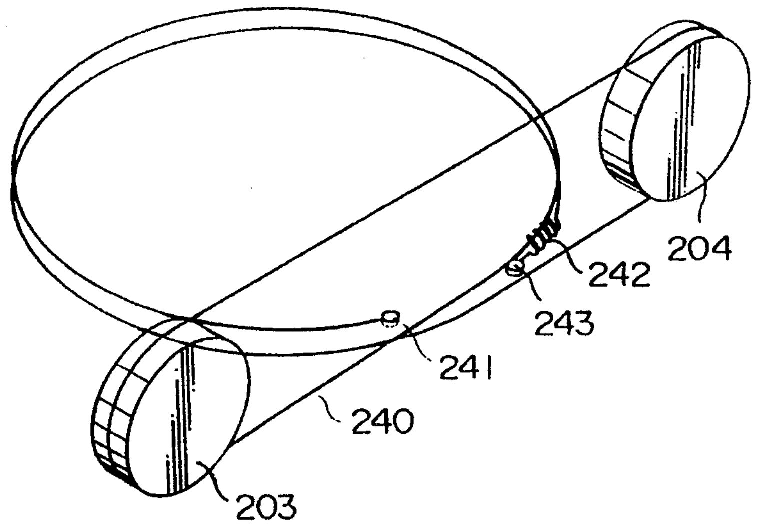
FIG. 5 is a perspective view illustrating a taking-up mechanism.

In the bobbin portion 233 of the cam 230, the wire 240 is spanned between two pulleys 203 and 204 which are spaced along the direction of the optical axis of the zoom lens system 16, as shown in FIG. 5. One end of the wire 240 is connected to the cam 230 by means of a pin 241, and the other end of the wire 240 is connected to the cam through a tension spring 242 which is fixed on the cam 230 by means of a pin 243 so that appropriate tension is applied to the wire 240.

In more detail, as shown in FIG. 5, an end of the wire 240 is fixed on the cam 230 by means of the pin 241. Then, the wire 240 is wound around the bobbin portion 233 by one turn. Then the wire 240 is wound around the pulleys 203, 204. Note that a plane including the wire 240 wound around the cam 230 and another plane including the wire wound between the pulleys 203 and 204 are substantially perpendicular to each other. The wire 240 wound between the pulleys 203 and 204 is then wound around the cam 230 again and fixed to the cam 230 through the tension spring 242.

With this construction, in response to the rotation of the cam 230 driven by the main motor 210, the pulley 203 is synchronously rotated by the wire 240.

Since the pulley 203 as well as the pair of rollers, 201, 201 are fixed on the shaft 202, the carriage 200 shifts along the rack 101*a* as a whole in the direction of the optical axis along the zoom lens system 16 synchronously with the turning movement of the cam 230, i.e., in accordance with the rotation of the pulley 203.

Since the rollers 201, 201 are arranged sufficiently far from a center of gravity of the carriage 200, a driving force can be smoothly transmitted from the carriage 200 to the main body 100 through the pair of rollers 201 and 201. Namely, this construction is advantageous as compared with a conventional apparatus. That is, the conventional apparatus, generally, is constituted such that a point offset from the center of gravity is pulled when the carriage is shifted. On the contrary, in accordance with this embodiment, the carriage 200 can slide smoothly without causing the optical axis to be undesirably inclined.

Next, a mechanism for shifting respective lens groups with respect to the carriage 200 is explained.

The lens groups L1, the variable power lens group L2, and the correction lens group L3 are accommodated in lens barrels 300, 310, and 320 as shown in FIG. 6, respectively. These lens barrels 300, 310, and 320 are slidably housed in a cylinder 250. Inside the cylinder 250, a pair of grooves 251 and 251 (FIG. 4) for preventing rotational displacement of the lens barrels 300, 310, and 320. Respective lens barrels have outer peripheral portions being formed with projections (not-shown) engaging with the grooves 251.

Furthermore, at one edge of the cylinder 250, the color separation means 15 is provided for selectively inserting the M, B, G, and R filters 330, 331, 332, and 333 into the optical path or retracting them therefrom.

The lens barrel 300 is fixed to the carriage 200 and is shifted the same amount as the carriage 200 shifts in response to the rotation of the main motor 210. The lens barrel 310 has a pin 311 fitted into the cam groove 231 and is shifted relative to the carriage 200 in accordance with the rotation of the main motor 210. The lens barrel 320 has a pin 321 engaged with the elongated hole 222*b* of the sector gear 222 and is shifted relative to the carriage 200 in accordance with the rotation of the secondary motor 220, independently of the lens barrel 310.

Figure 1:
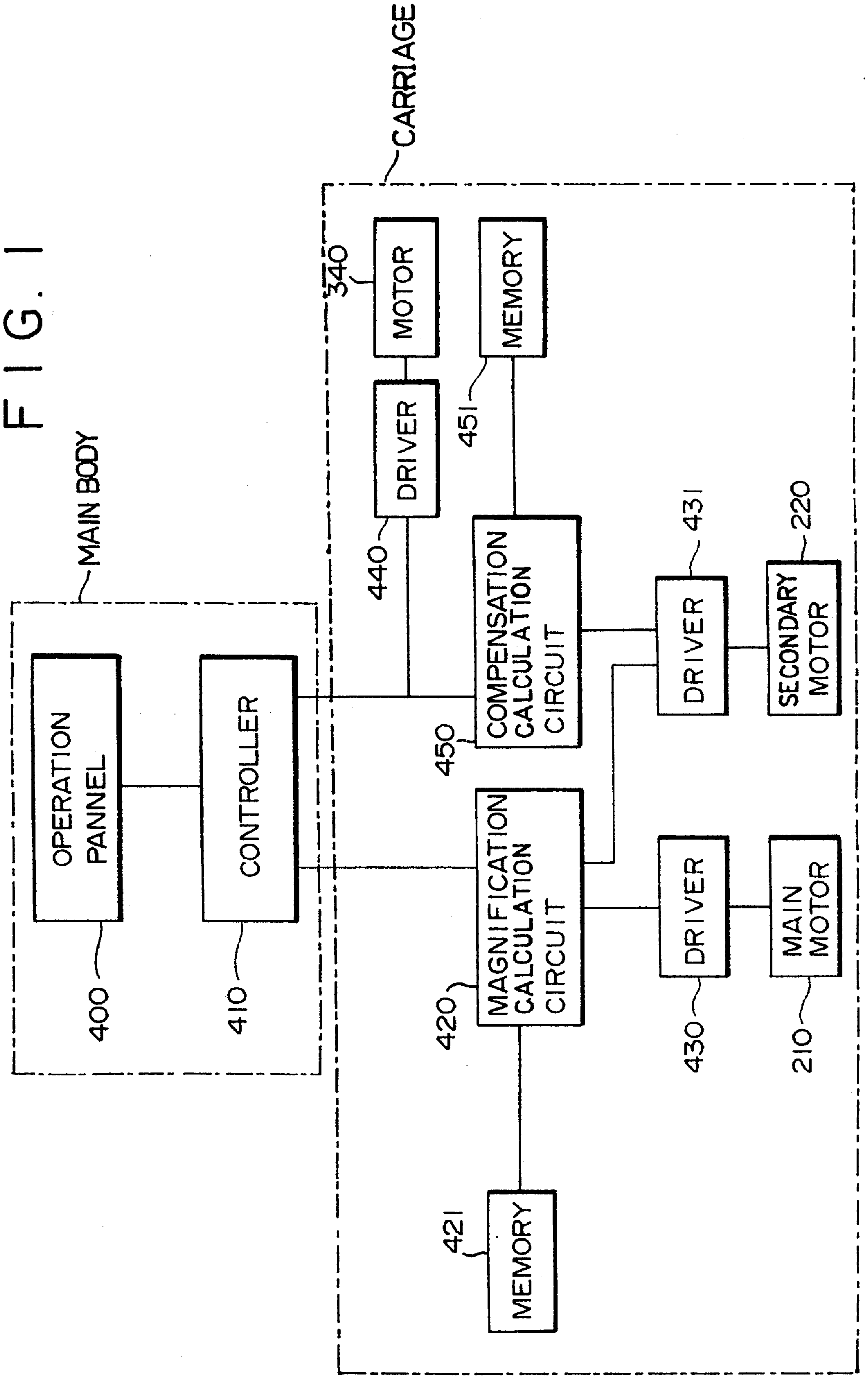
FIG. 1 is a schematic block diagram showing a control system of an optical device embodying the present invention.

Next, a control system of the above-described color copy machine is explained with reference to FIGS. 1 and 7. In the following explanation, only an adjustment function for adjusting a focal point and magnification is explained. Therefore, a scanning function by the light source 12 and the mirrors 13, 14 or controls for the charging means 18, the developing means 19, the transfer means 20 etc., which are similar to the well-known method, are not explained here.

Figure 8:
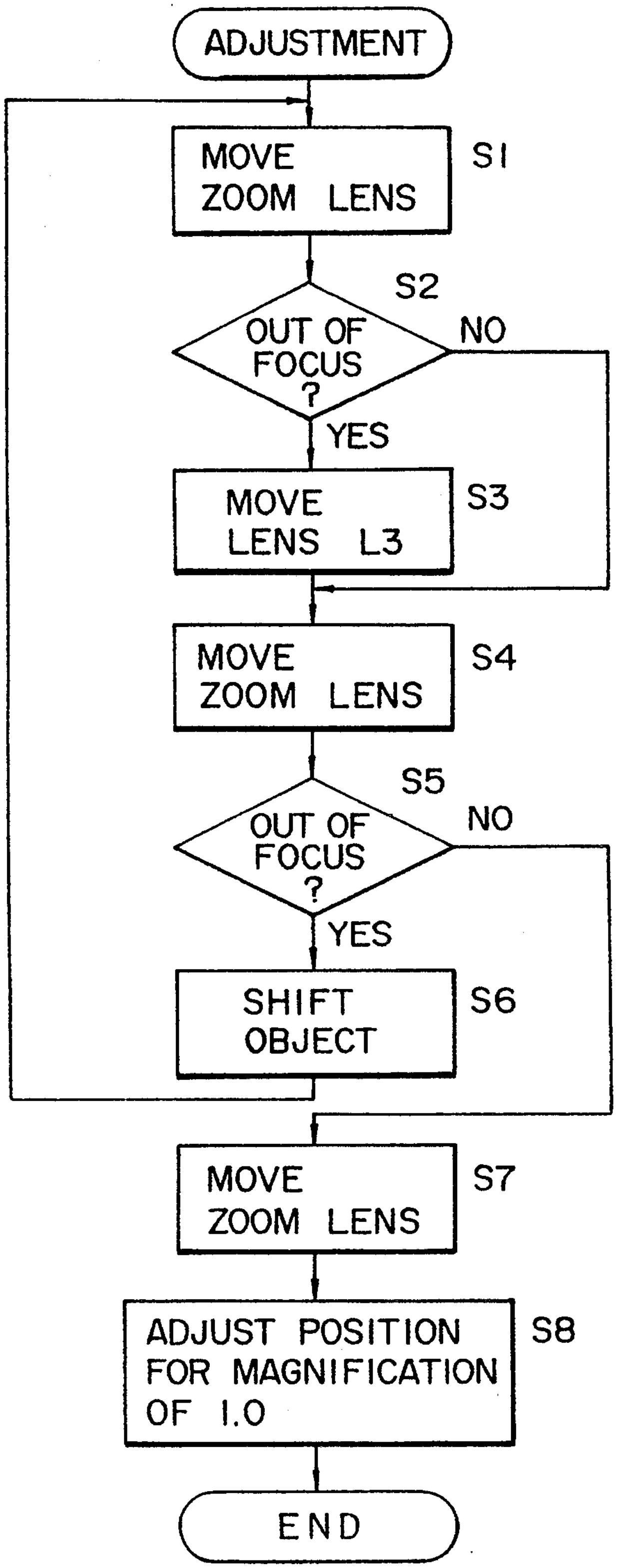
FIG. 8 is a flowchart illustrating the adjustment operation of the carriage.

FIG. 8 is a flowchart illustrating the adjustment operation. The adjustment operation is executed by using a not-shown apparatus for adjustment. Alternatively, the adjustment operation can be performed by replacing the photoconductive drum 17 with a predetermined testing chart, and replacing the object O with a translucent sheet on which a predetermined pattern has been printed. With this arrangement, an image of the chart is projected onto the translucent sheet, and the adjustment of the focus point is executed by monitoring the image on the translucent sheet.

Figure 7A:
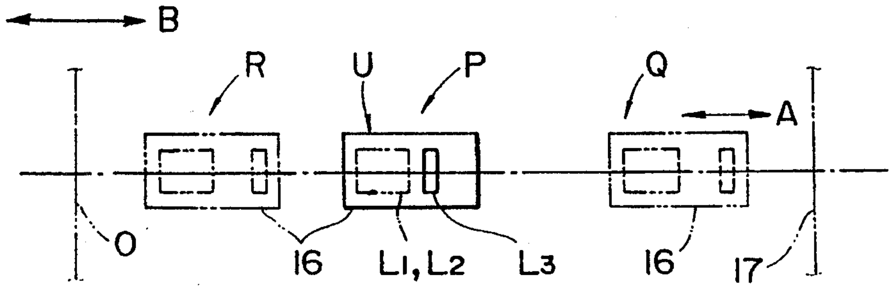
FIGS. 7A–7C are schematic view illustrating an operation of the optical device embodying the present invention.

When the adjusting operation is executed for the carriage 200, first, the zoom lens system 16 is positioned at a reference position P which is to be designed to realize a predetermined magnification (for example, a magnification of 1.0), as shown in FIG. 7(A). In this case, as indicated by letter U in the drawing, the lens groups L1, L2, and L3 are positioned at respective predetermined positions which are designed so that the zoom lens system 16 can realize a predetermined magnification (i.e. the magnification of 1.0).

It should be noted that an individual lens consisting of respective ions groups L1, L2, and L3 may include a manufacturing error, and it is feared that the zoom lens system 16 causes a deviation in focus. Therefore, the focal point of the zoom lens system 16 may cause a deviation in focus even if the zoom lens system 16 is correctly positioned at the reference point P and also the respective lens groups L1, L2, and L3 are correctly positioned at the predetermined positions as indicated by the letter U.

In this situation, the magnification is altered from the initial predetermined magnification (i.e. 1.0) to a different magnification such as the magnification of 0.5 (in step S1). That is, the zoom lens system 16 is moved from the reference position P to a position Q designed to realize a magnification of 0.5.

If a focal point error is caused in the zoom lens system 16 based on errors of respective lens groups, a focal point adjustment is executed by shifting the correction lens group L3 as shown by an arrow A in the drawing (in steps S2 and S3). As aforementioned, the correction lens group L3 is moved in response to the rotation of the motor 220. The shifting amount of the correction lens L3 during the above focal point adjustment will be referred to as amount S.

Subsequently, maintaining the amount S, i.e., with shifting the correction lens L3 by the amount S, the zoom lens system 16 is moved from the point Q corresponding to a magnification of 0.5 to another point, for example, the point R corresponding to a magnification of 2.0 (in step S4).

in this case, if a focal point error occurs again, a focus point adjustment is further executed by shifting the object O in the direction shown by an arrow B in the drawing (in steps S5 and S6). If the adjustment operation is performed with using the copy machine, the shifting of the object O is done by changing the respective distance between the mirrors 13 and 14.

The operation described above, i.e., adequately selecting two points at which the zoom lens system 16 can realize different magnifications, then adjusting the focus point by shifting the correction lens L3 at one of the two points, and adjusting the position of the object when the zoom lens system 16 is located at the other point (steps S1 through S6), is repeated until the focal point error is eliminated at any two points ("No" in step S5).

Figure 7B:
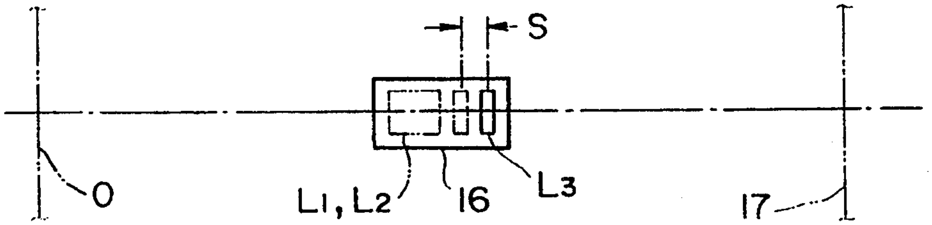

Next, as shown in FIG. 7(B), the zoom lens system 16 is located at the position corresponding to a magnification of 1.0, i.e., the reference position P (step S7). In this situation, since the correction lens group L3 is shifted by the amount S, the zoom lens system 16 may not provide a magnification of 1.0. Namely, there occurs a magnification error.

Figure 7C:
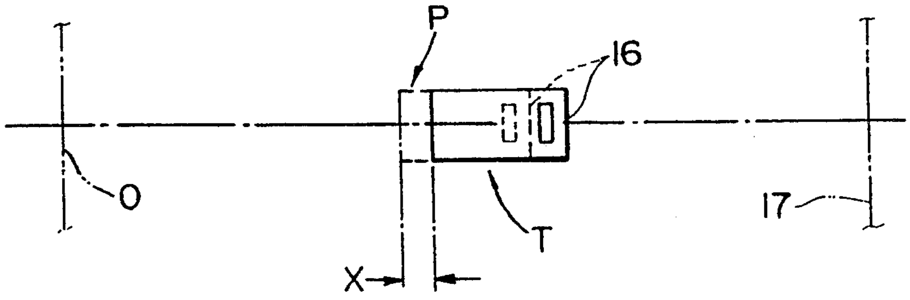

In order to realize a magnification of 1.0, the zoom lens system 16 is moved, as shown in FIG. 7(*c*), from the reference point P to a position T where the magnification error can be eliminated to 0 (in step S8). A reference symbol X denotes a shifting amount of the zoom lens system 16 relative to the reference position P in this adjustment operation.

Above-described S and X are unique values inherent to individual carriage 200 and, therefore, are measured and set when the adjustment operation for the carriage 200 is executed. These values S and X are stored in a data holding means, i.e., a ROM circuit 421 which is accommodated in the carriage 200 as shown in FIG. 1.

The ROM circuit 421 is constituted so as to be rewritten every time data is newly inputted. Thus, the data X and S are updated during the adjustment operation for the carriage 200, and lastly set values are stored in the ROM circuit 421. This ROM circuit 421 can be substituted by, for example, a dip switch. Namely, the dip switch can be constituted to set the previously described S and X values.

Next, the following explanation is the case where the carriage 200 is assembled with the main body 100 in which the carriage is to be used. It should be noted that when the adjustment operation is performed with a testing device, the distance of the mirrors 13 and 14 is adjusted in accordance with the shift amount of the object determined during the adjusting operation.

Figure 9:
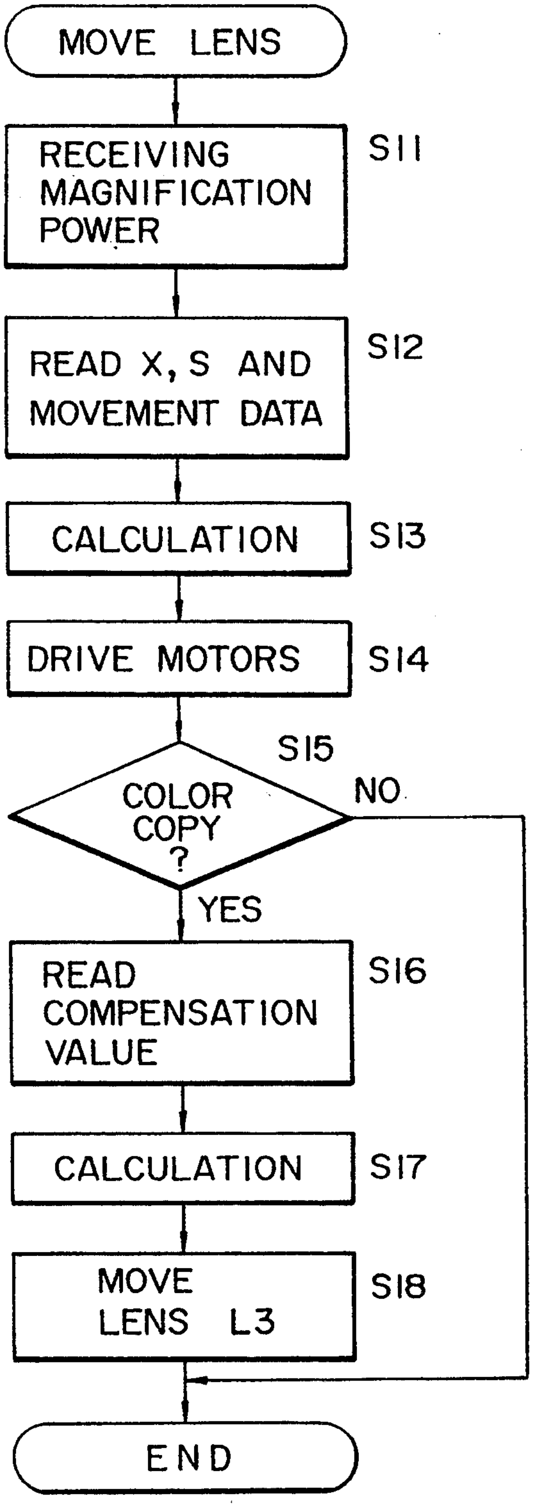
FIG. 9 is a flowchart illustrating the operation of the optical device embodying the present invention.

FIG. 9 is a flowchart illustrating the process of driving the zoom lens system 16. First of all, an operator places the carriage 200 at a predetermined set position determined in advance on the main body 100. This set position is determined so as to correspond to the reference position formed on the carriage 200. With this condition, if an operation for selecting a magnification (for example, a selection of a magnification of 2.0) is performed on an operation panel 400 provided on the main body 100 as shown in FIG. 1, these information are transmitted from the operation panel 400 to a controller 410 (step S11).

When the magnification is changed, for example, from 1.0 to 2.0, the controller 410 supplies magnification signals to a magnifying power calculation circuit 420. In accordance with the magnification signals, respective lens positions are read out from the ROM circuit 421, which holds lens shifting data in a monochrome copy operation and unique data S and X.

Then, actuating amounts of the main motor 210 and the secondary motor 220 are calculated based on the read-out lens positions and a presently set lens position. In accordance with the calculated actuating amounts, drivers 430 and 431 generate pulses to rotate respective motors (steps S12, S13 and S14). With this control, the zoom lens 16 can be moved from the reference position to the regular position of a magnification of 2.0.

Though the above-described magnification setting is sufficient for the monochrome copy operation, further adjustments are required for the color copy operation.

That is, the memory 451 stores in advance a shifting amount of the lens group L3 relative to the reference position which is required for correcting a deviation of an image plane with respect to the drum surface 17, occurring when the B, G, R filters are used, respectively. Thus, relative positions of respective lens groups can be changed from the positions in the monochrome copy operation to proper positions corresponding to the used color filters (in steps S15 and S16). Thus, the color-separated images are rearranged on the drum surface.

Alternatively, it is possible to make the lens group L1 shiftable, and shifting the image plane by shifting the lens group L1 in a manner similar to the above.

With this arrangement, the controller 410 outputs a filter change signal to a driver 440. That is, the monochrome (M) filter 330 is inserted in the optical path to execute a copy operation. Subsequently, the B, G, and R filters 331, 332, and 333 are successively inserted in the optical path. At the same time, a correcting value calculation circuit 450 reads out correction data from a memory 451, which stores the correction data, in response to the changeover of fillers. Then, the correcting value calculation circuit 450 outputs a driving signal to a driver 431. The driver 431 actuates the secondary motor 220 on the basis of both signals supplied from the magnifying power calculation circuit 420 and the correction value calculation circuit 450 (step S17).

Thus, the shift position of the correction lens group L3 is corrected in accordance with the choice of filter (step S18), the image of any color to be copied can be accurately focused on the drum surface without causing any color drift or any deviations in focus.

Furthermore, by utilizing two motors to control the shift movement of the lens, it becomes possible to easily realize a complicated shift movement of the respective lens groups which were not realized by the mechanical control by means of the cam. Accordingly, the shift of the image surface can be corrected without perfectly correcting for the color aberration of each lens. Thus, it becomes unnecessary to use an expensive nitric material having a smaller dispersion for the image-forming lens.

Moreover, the change of the shift amount can be carried out by merely changing a software.

Further, it is possible to correct a deviation of image position due to an environment change by additionally providing a means for detecting an application environment such as a temperature, a humidity, and a means for calculating a motor driving amount required for correcting an image position by using these detected data as parameters.

In this manner, since the ROM circuit 421 provided in the carriage 200 stores unique data required for correcting the deviations in focus and the magnification error derived from a manufacturing error of the individual lens, the focus adjustment and the magnification adjustment can be simply executed when the carriage 200 is assembled onto the apparatus main body 100.

As is described in the foregoing description, in accordance with the optical variable power apparatus of the present invention, the data holding means is provided on the carriage and this data holding means memorizes data unique to individual zoom lens such as a focal point error or a magnification error. Therefore, it becomes possible to provide an optical variable power apparatus capable of simplifying the focal point error correction and the magnification error correction causing when the carriage is set to the apparatus main body.

As tills invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matter contained in Japanese Patent Application Nos. HEI 2-278547, filed on Oct. 16, 1990, HEI 3-226639, filed on May 28, 1991, and HEI 3-268108, filed on Jul. 16, 1991, which are expressly incorporated by reference in their entireties.

What is claimed is:

1. An optical device employed in an imaging apparatus, said optical device comprising:

a zoom lens system capable of varying the magnification power thereof, said zoom lens system including at least one correction lens group movable relative to a zoom lens assembly of said zoom lens system to correct the focusing error which is inherent in said zoom lens system;

first driving means for driving said zoom lens system;

second driving means for driving said correction lens group independently of said first driving means;

storing means for storing at least one data pair for correcting said inherent focusing error and a magnification error with respect to the position of said zoom lens system, said data pair being unique for a carriage member supporting said zoom lens system and remaining the same for all magnification powers of said zoom lens system; and control means for controlling said first and second driving means in such a fashion that said first driving means drives said zoom lens system in accordance with the magnifying power and said at least one data pair for correcting said magnification error, and wherein said second driving means drives said correction lens group in accordance with said at least one data pair for correcting said inherent focusing error.

2. An optical device to be employed in an imaging apparatus, said optical device being capable of changing the magnifying power thereof, said optical device comprising:

a carriage member; and a lens system mounted on said carriage member; wherein said carriage member is movable in a direction along the optical axis of said lens system, and wherein said lens system includes:

a first lens group for varying the magnification power of said lens system, said first lens group being movable with respect to said carriage member, movement of said first lens group being a function of movement of said carriage member; and a second lens group for correcting a focusing error of said lens system, an optical axis of said second lens group coinciding with the optical axis of said first lens group, said second lens group being movable with respect to said carriage member, and wherein said optical device further comprises:

first driving means for driving said carriage member, and for driving said first lens group relative to said carriage member;

second driving means for driving said second lens group relative to said carriage member independently of said first driving means;

storing means for storing at least one data pair for correcting an inherent focusing error of said lens system and a magnification error with respect to the position of said lens system, said data pair being unique for said carriage member and remaining the same for all magnification powers of said lens system; and control means for controlling said first and second driving means in such a fashion that said first driving means drives said lens system in accordance with the magnifying power and said at least one data pair for correcting said magnification error, and that said second driving means drives said second lens group in accordance with said at least one data pair for correcting said inherent focusing error.

3. The optical device according to claim 2, wherein a first one of said at Least one data pair stored in said storing means comprises data representing the amount of displacement of said second lens group for cancelling said inherent focusing error.

4. The optical device according to claim 3, wherein a second one of said at least one data pair stored in said storing means comprises another data representing the amount of displacement of said carriage member with respect to said optical device for correcting said magnification error.

5. The optical device according to claim 2, further comprising at least one filter member, wherein said at least one data pair stored in said storing means comprises at least one other unique data pair for use when said at least one filter member is used.

6. The optical device according to claim 2, wherein said first and second drive means comprise motors, respectively, and wherein said control means comprises calculation means for calculating a driving amount of a respective one of said motors.

7. The optical device according to claim 2, wherein said control means includes means for calculating a magnifying power which calculates an actuating amount of said first driving means based on the data stored in said storing means.

8. The optical device according to claim 2, wherein said data stored in said storing means which is inherent in said zoom lens system is measured prior to an installation of said carriage member in said imaging apparatus.

9. The optical device according to claim 2, further comprising a correcting value calculating means for calculating a correcting value to actuate the second driving means.

10. An optical device for an imaging apparatus, said device comprising:

a carriage supporting a lens system and movable along an optical axis of said lens system, said lens system supported by said carriage comprising:

a first lens group for varying a magnification power of said lens system, said first lens group being movable with respect to said carriage; and a second lens group for correcting a focusing error of said lens system, said second lens group being movable with respect to said carriage, said first and second lens groups being movable independently of each other;

said carriage further comprising;

first driving means for driving said carriage, and for driving said first lens group relative to said carriage;

second driving means for driving said second lens group relative to said carriage independently of said first driving means;

storing means for storing at least one data pair for correcting a focusing error of said lens system and a magnification error with respect to the position of said lens system, said data pair being unique for a predetermined carriage supporting said lens system and remaining the same for all magnification powers of said lens system;

control means for controlling drive amounts of said first driving means and said second driving means in accordance with the magnifying power and said at least one data pair, for correcting a magnification error, and for controlling drive amounts of said second driving means in accordance with said at least unique data pair, for correcting a focusing error.

11. An optical device comprising:

a carriage member;

a lens system mounted on said carriage member;

wherein said lens system includes:

a first lens group for varying the magnification power of said lens system, said first lens group being movable with respect to said carriage member; and a second lens group for correcting a focusing error of said lens system, said second lens group being movable with respect to said carriage member, said first and second lens groups being movable independently of each other;

said carriage member further comprising:

first driving means for driving said carriage member, and for driving said first lens group relatively to said carriage member;

second driving means for driving said second lens group relative to said carriage independently of said first driving means;

storing means for storing at least one data pair for correcting a focusing error of said lens system and a magnification error with respect to the position of said lens system, said data pair being unique for a predetermined carriage member supporting said lens system and remaining the same for all magnification powers of said lens system;

control means for controlling drive amounts of said first driving means and said second driving means in accordance with the magnifying power and said at least one data pair, for correcting a magnification error, and for controlling drive amounts of said second driving means in accordance with said at least one data pair for correcting a focusing error; and means for transmitting magnification data and said at least one data pair to said control means and said first and second driving means, and for controlling communication between said control means and said first and second driving means.

12. A method for correcting a focusing error associated with a zoom lens system movably mounted on a carriage, comprising:

obtaining a unique data pair, a first data of the unique data pair representing a distance a focusing lens group of the zoom lens system is moved during correction of a focusing error and a second data of the data pair representing a distance the zoom lens system is moved during correction of a magnification error, the data pair being unique for a predetermined carriage and for all magnifications of the lens system;

storing the obtained unique data pair in a data storage means; and utilizing the stored unique data pair when the carriage is mounted on an apparatus main body to correct for focusing and magnification errors of the zoom lens system.

13. The method of correcting focusing error according to claim 12 the method further comprising:

utilizing at least one color filter together with the zoom lens system obtaining another unique data pair for each color filter being utilized with the lens system, storing the obtained another unique data pair in a data storage means; and utilizing the stored another unique data pair when the carriage is mounted on to the apparatus main body.

14. The method of correcting focusing error according to claim 12, the obtaining a unique data pair further comprising:

(1) positioning the zoom lens system at a first predetermined magnification position;

(2) moving the correction lens group to obtain a focused image;

(3) moving the zoom lens system to a second predetermined magnification position;

(4) changing the optical path length of the zoom lens system to get a focused image;

(5) moving the lens system back to the first predetermined magnification position;

(6) moving the correction lens group to get a focused image;

(7) moving the lens system to the second predetermined magnification position;

(8) changing the optical path length of the lens system to get a focused image;

repeating steps (5) through (8) to obtain a unique data which indicates the moving distance of the correction lens group to achieve an in-focus condition for both predetermined magnification positions;

moving the zoom lens system back to the first predetermined magnification position; and moving the zoom lens system by distance to correct the magnification error resulting from focus error correction.

15. The optical device according to claim 1, wherein an optical path length of said zoom lens system does not change when the magnification changes.

16. The optical device according to claim 2, wherein an optical path length of said lens system does not change when the magnification changes.

17. The optical device according to claim 4, said another data representing an adjustment amount of the optical path for correcting said magnification error.

18. An optical device according to claim 10, said carriage further comprising:

third driving means for additionally driving said second lens group relative to the carriage independently of said first driving means;

another storing means for storing another unique data pair of said at least one data pair when a filter is used; and calculation means for calculating an actuating amount of said third driving means in accordance with said another unique data pair of said at least one data pair.

19. An optical device according to claim 11, said carriage further comprising:

third driving means for driving said second lens group relative to the carriage independently of said first driving means;

second storing means for storing another unique data pair of said at least one data pair when a filter is used; and calculation means for calculating actuating amount of said third driving means in accordance with said another unique data pair of said at least one data pair.

* * * * *

UNITED STATES PATENT AND TRADEMARK OFFICE

CERTIFICATE OF CORRECTION

PATENT NO. : 5,367,406

DATED : November 22, 1994

INVENTOR(S) : Minoru SUZUKI et al.

It is certified that error appears in the above-indentified patent and that said Letters Patent is hereby corrected as shown below:

At column 9, line 45 (claim 3, line 2), change "Least" to ---least---.

Signed and Sealed this

Twenty-seventh Day of June, 1995

Attest:

BRUCE LEHMAN

*Attesting Officer*

*Commissioner of Patents and Trademarks*